US009020215B2

(12) United States Patent
Chen et al.

(10) Patent No.: US 9,020,215 B2
(45) Date of Patent: Apr. 28, 2015

(54) SYSTEMS AND METHODS FOR DETECTING AND VISUALIZING CORRESPONDENCE CORRIDORS ON TWO-DIMENSIONAL AND VOLUMETRIC MEDICAL IMAGES

(75) Inventors: Yuanhsi (Tony) Chen, Mt. Laurel, NJ (US); Zhigang Peng, Blue Bell, PA (US); Venkat Raghavan Ramamurthy, Malvern, PA (US); Xiang Sean Zhou, Exton, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 964 days.

(21) Appl. No.: 12/789,535

(22) Filed: May 28, 2010

(65) Prior Publication Data

US 2010/0303314 A1 Dec. 2, 2010

Related U.S. Application Data

(60) Provisional application No. 61/182,262, filed on May 29, 2009.

(51) Int. Cl.
*G06K 9/00* (2006.01)
*G06T 7/00* (2006.01)

(52) U.S. Cl.
CPC ..... *G06T 7/0028* (2013.01); *G06T 2207/10072* (2013.01); *G06T 2207/30004* (2013.01)

(58) Field of Classification Search
USPC ........................... 382/128, 131, 190; 600/449
See application file for complete search history.

(56) References Cited

U.S. PATENT DOCUMENTS

| | | | |
|---|---|---|---|
| 2002/0072670 A1* | 6/2002 | Chenal et al. ................. | 600/449 |
| 2006/0008150 A1* | 1/2006 | Zhao et al. .................... | 382/190 |
| 2006/0093209 A1 | 5/2006 | Guetter et al. | |
| 2008/0267483 A1 | 10/2008 | Zhan et al. | |

OTHER PUBLICATIONS

Leventon et al., "Multi-modal volume registration using joint intensity distributions [medical images]", Medical Image Computing and Computer-Assisted Intervention MICCAI 98; [Lecture Notes in Computer Science], Springer-Verlag, Berlin, Germany, Jan. 1, 1998, pp. 1057-1066.
International Search Report of Application No. PCT/US2010/036799 dated Sep. 13, 2010.

\* cited by examiner

*Primary Examiner* — Valerie Lubin
(74) *Attorney, Agent, or Firm* — Peter R. Withstandley

(57) ABSTRACT

A method is provided for detecting a corresponding region of interest in digital medical images, the method including receiving a plurality of digital images including a primary image, at least one of the images being a projective image, identifying anatomical landmarks and structures within each of the images and correlating the images based on the identified anatomical landmarks and structures identifying a location of interest in the primary image, and automatically identifying a region of interest in the rest of the images, the region of interest corresponding to the identified location of interest in the primary image.

20 Claims, 7 Drawing Sheets

SYSTEMS AND METHODS FOR DETECTING AND VISUALIZING CORRESPONDENCE CORRIDORS ON TWO-DIMENSIONAL AND VOLUMETRIC MEDICAL IMAGES

CROSS-REFERENCE TO RELATED APPLICATION

The present application claims benefit of U.S. Provisional Application No. 61/182,262, filed May 29, 2009, the contents of which is hereby incorporated herein by reference in its entirety.

TECHNICAL FIELD

The present disclosure relates to anatomy detection and, more specifically, to detection and visualization of a region of interest in one or more medical images based upon a corresponding region of interest in a primary medical image.

BACKGROUND

The field of medical imaging has seen significant advances since the time X-Rays were first used to determine anatomical abnormalities. Medical imaging hardware has progressed in the form of newer machines such as Medical Resonance Imaging (MRI) scanners, Computed Axial Tomography (CAT) scanners, etc. Because of large amount of image data generated by such modern medical scanners, there has been and remains a need for developing image processing techniques that can automate some or all of the processes to determine the presence of anatomical abnormalities in scanned medical images.

Recognizing anatomical structures within digitized medical images presents multiple challenges. For example, a first concern relates to the accuracy of recognition of anatomical structures within an image. A second area of concern is the speed of recognition. Because medical images are an aid for a doctor to diagnose a disease or condition, the speed with which an image can be processed and structures within that image recognized can be of the utmost importance to the doctor reaching an early diagnosis. Hence, there is a need for improving recognition techniques that provide accurate and fast recognition of anatomical structures and possible abnormalities in medical images.

Digital medical images are constructed using raw image data obtained from a scanner, for example, a CAT scanner, MRI, etc. Digital medical images are typically either a two-dimensional ("2-D") image made of pixel elements or a three-dimensional ("3-D") image made of volume elements ("voxels"). Such 2-D or 3-D images are processed using medical image recognition techniques to determine the presence of anatomical structures such as cysts, tumors, polyps, etc. Given the amount of image data generated by any given image scan; it is preferable that an automatic technique should point out anatomical features in the selected regions of an image to a doctor for further diagnosis of any disease or condition.

One general method of automatic image processing employs feature based recognition techniques to determine the presence of anatomical structures in medical images. However, feature based recognition techniques can suffer from accuracy problems.

Automatic image processing and recognition of structures within a medical image is generally referred to as Computer-Aided Detection (CAD). A CAD system can process medical images and identify anatomical structures including possible abnormalities for further review. Such possible abnormalities are often called candidates and are considered to be generated by the CAD system based upon the medical images.

During the reading and analysis of medical images, whether performed manually by a doctor or performed automatically by automatic image processing systems, a region of interest may be identified in a first or primary medical image. Due to the wide variety of different imaging modalities as well as the infinite variety of individual patient anatomies, it is no trivial task to locate the corresponding region of interest in one or more other medical images, where the corresponding region of interest corresponds to the identified region in the first or primary image. This is especially difficult when the medical images are projective images such as X-ray images in which from various directions and angles, imaged anatomy may be obstructed or obscured by other anatomical structures and it can be near impossible to obtain a direct point-to-point correspondence location from one image to the next.

Therefore there is a need for improved systems and methods to facilitate detection and visualization of a region of interest in one or more medical images based upon a corresponding region of interest in a primary medical image.

SUMMARY OF THE INVENTION

According to one aspect of the present disclosure a method is provided for detecting a corresponding region of interest in digital medical images, the method including receiving a plurality of digital images including a primary image, at least one of the images being a projective image. The method includes identifying anatomical landmarks and structures within each of the images and correlating the images based on the identified anatomical landmarks and structures. The method further includes identifying a location of interest in the primary image, and automatically identifying a region of interest in the rest of the images, the region of interest corresponding to the identified location of interest in the primary image. The anatomical landmarks and structures identified in the images can be insufficient for a direct point-to-point correspondence. The images can include one or more images selected from: X-ray images, CT scan images, PET scan images, PET-CT images, SPECT images, SPECT-CT images, MR images, MR-PET images, and dynamic scans of one of these modalities continuous in time or gated in time, where gating is based on respiration or cardiac cycles. The method can further include displaying a visualization on each of the images highlighting the region of interest. The visualization can be in the shape of a circle, sphere, band, or cylinder spanning one or more image modalities and one or more time points or a continuum of time. The images can be all X-ray images. The images can be images from a plurality of different modalities. The method can further include correlating the images comprising, for each of the plurality of digital images: (1) correcting for in-plane rotations based on the identified anatomical landmarks and structures; (2) identifying common subspace shared with the primary image; and (3) calculating a correspondence matrix in the common subspace. Calculating the correspondence matrix can include matching a subset of identified anatomical landmarks and structures in the primary image and at least one other of the images. Calculating the correspondence matrix can include matching locations of the identified anatomical landmarks and structures in the plurality of digital images based upon a predetermined spatial relationship scheme. Calculating the correspondence matrix can include identifying at least one set of training images having substantially similar identified anatomical landmarks and structures, and selecting a training correspondence matrix of the at least one set of training images as the correspondence matrix of the images.

According to another aspect of the present disclosure, a program storage device readable by a computer, tangibly embodying a program of instructions executable by the computer is provided to perform method steps for detecting a corresponding region of interest in digital medical images. The method including receiving a plurality of digital images including a primary image, where at least one of the plurality of images is a projective image, and identifying anatomical landmarks and structures within each of the plurality of digital images. The method further including correlating the plurality of images based on the identified anatomical landmarks and structures, identifying a is location of interest in the primary image, and automatically identifying a region of interest in the plurality of images, the region of interest corresponding to the identified location of interest in the primary image. The anatomical landmarks and structures identified in the images can be insufficient for a direct point-to-point correspondence. The images can include one or more images selected from: X-ray images, CT scan images, PET scan images, PET-CT images, SPECT images, SPECT-CT images, MR images, MR-PET images, and dynamic scans of one of these modalities continuous in time or gated in time, where gating is based on respiration or cardiac cycles. The method can further include displaying a visualization on each of the images, the visualization highlighting the region of interest. The visualization can be in the shape of a circle, sphere, band, or cylinder spanning one or more image modalities and one or more time points or a continuum of time. The images can be all X-ray images. The images can be from a plurality of modalities. Correlating the plurality of images can further include, for each of the images: (1) correcting for in-plane rotations based on the identified anatomical landmarks and structures; (2) identifying common subspace shared with the primary image; and (3) calculating a correspondence matrix in the common subspace. Calculating the correspondence matrix can include matching a subset of identified anatomical landmarks and structures in the primary image and at least one other images. Calculating the correspondence matrix can further include matching locations of the identified anatomical landmarks and structures in the images based upon a predetermined spatial relationship scheme. Calculating the correspondence matrix can further include identifying at least one set of training images having substantially similar identified anatomical landmarks and structures, and selecting a training correspondence matrix of the set of training images as the correspondence matrix of the plurality of digital images.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings.

DETAILED DESCRIPTION OF THE INVENTION

Figure 1:
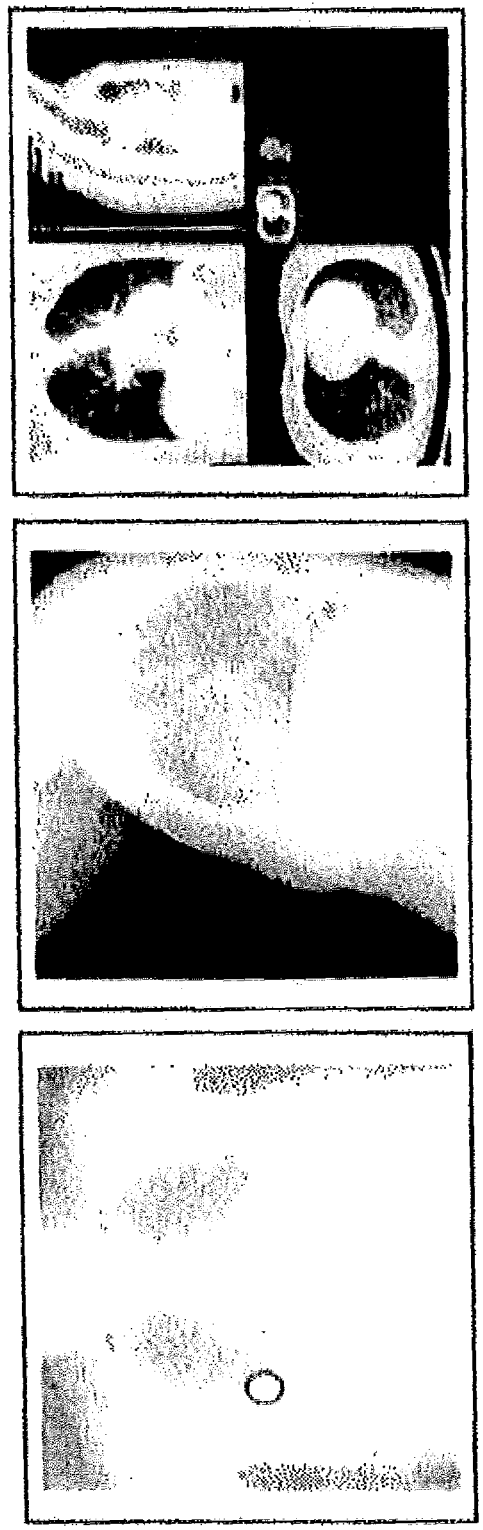
FIG. 1 is a set of medical images for the chest area according to an exemplary embodiment of the present disclosure.

In the following description, numerous specific details are set forth such as examples of specific components, devices, methods, etc., in order to provide a thorough understanding of embodiments of the present invention. It will be apparent, however, to one skilled in the art that these specific details need not be employed to practice embodiments of the present invention. In other instances, well-known materials or methods have not been described in detail in order to avoid unnecessarily obscuring embodiments of the present invention. While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

The term "x-ray image" as used herein may mean a visible x-ray image (e.g., displayed on a video screen) or a digital representation of an x-ray image (e.g., a file corresponding to the pixel output of an x-ray detector). The term "in-treatment x-ray image" as used herein may refer to images captured at any point in time during a treatment delivery phase of a radiosurgery or radiotherapy procedure, which may include times when the radiation source is either on or off. From time to time, for convenience of description, CT imaging data may be used herein as an exemplary imaging modality. It will be appreciated, however, that data from any type of imaging modality including but not limited to X-Ray radiographs, MRI, CT, PET (positron emission tomography), PET-CT, SPECT, SPECT-CT, MR-PET, 3D ultrasound images or the like may also be used in various embodiments of the invention.

Unless stated otherwise as apparent from the following discussion, it will be appreciated that terms such as "segmenting," "generating," "registering," "determining," "aligning," "positioning," "processing," "computing," "selecting," "estimating," "detecting," "tracking" or the like may refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices. Embodiments of the methods described herein may be implemented using computer software. If written in a programming language conforming to a recognized standard, sequences of instructions designed to implement the methods can be compiled for execution on a variety of hardware platforms and for interface to a variety of operating systems. In addition, embodiments of the present invention are not described with reference to any particular programming language. It will be appreciated that a variety of programming languages may be used to implement embodiments of the present invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc, Although an image can be thought of as a function from $R^3$ to R or $R^7$, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Exemplary embodiments of the present invention seek to provide an approach for automatically selecting a scanning field within a medical image for the localization of a medical image study. By automatically selecting the scanning field, rather than having the field manually selected by a human operator, the process of acquiring a medical image may be sped up, made more reliable, and/or provide for a greater level of consistency and/or repeatability.

Specific embodiments of the present disclosure will be described by way of examples involving review of chest scans including chest X-ray images. However, as previously indicated, the present disclosure is not limited to use for X-ray images or chest imaging only and can be applied to other imaging modalities and locations.

When imaging the chest, it is common practice to obtain various different views. The most common are the anteroposterior/posteroanterior (AP/PA) and the lateral (LAT) views. FIG. 1 shows a series of chest images including an AP/PA image (left), a LAT image (center), and a PET/CT scan image (right). During the reading of chest X-ray images, when both AP/PA and LAT images have been obtained and are present, there is often a need to determine the corresponding evidence in the LAT view of a lesion or other location of interest found in the AP/PA view, and vice versa. Furthermore, when additional data is present, such as additional images from CT, MR, PET, etc, it is equally important to be able to determine the correspondence between the different images and different modalities. For example, when AP/PA and LAT chest X-ray images are available and a volumetric CT scan is also available for the same patient, the correspondence among all of the two dimensional and three dimensional (and even four dimensional for temporal sequences of volumetric data or multi-modality data, such as PET/CT) data would be extremely helpful to practitioners but is notoriously difficult to determine with accuracy.

Figure 3:
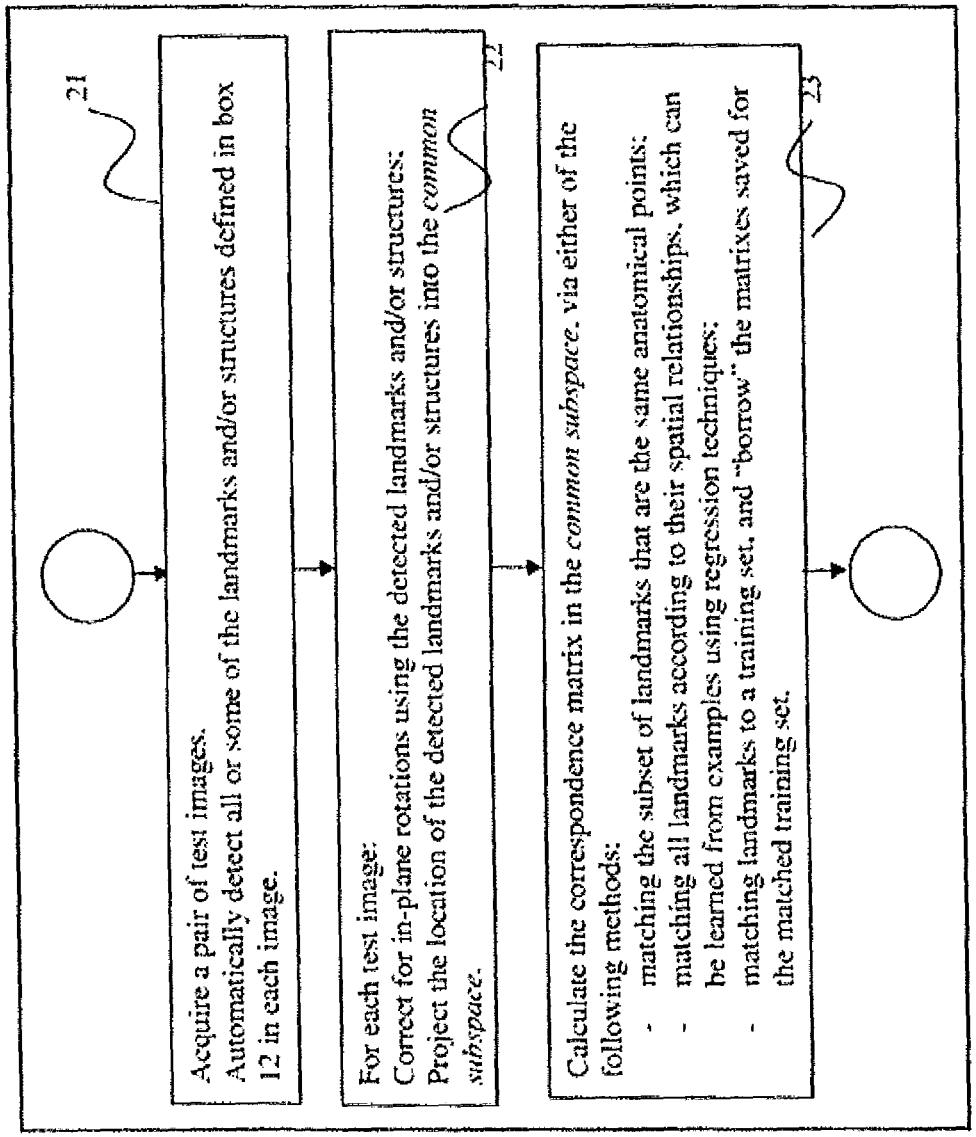
FIG. 3 is a flow chart illustrating a method for image detection and analysis using the direct-matching approach according to an embodiment of the present disclosure.
Figure 4:
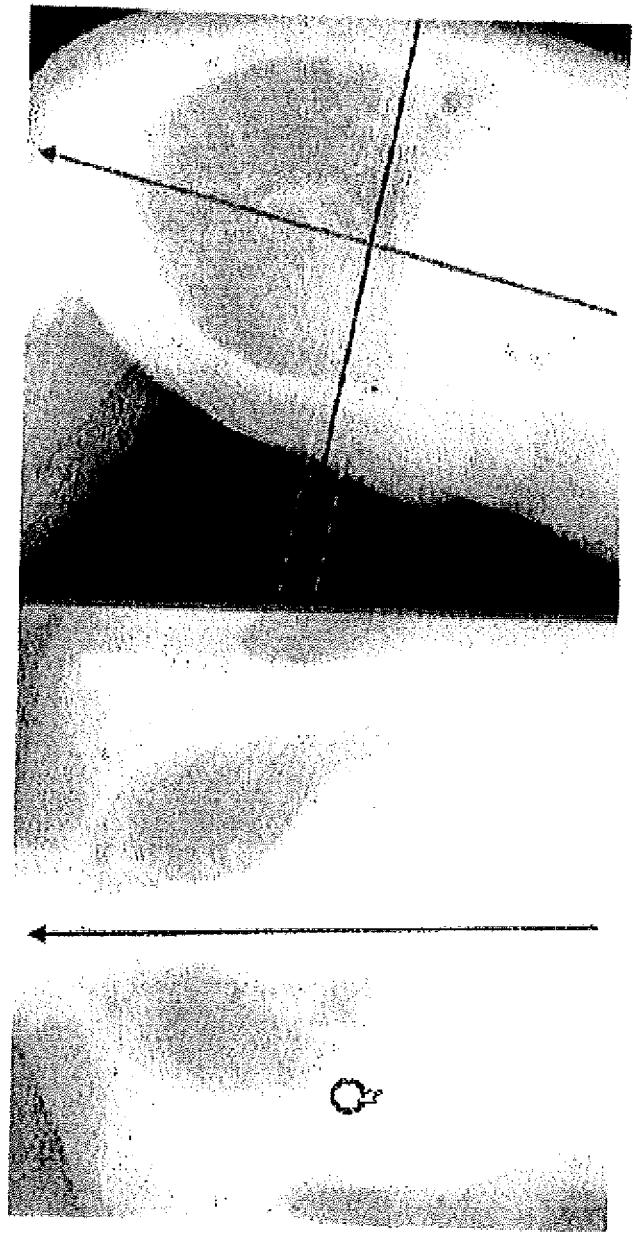
FIG. 4 is a set of medical images of the chest including a visualization of a correspondence region of interest according to an embodiment of the present disclosure.
Figure 5:
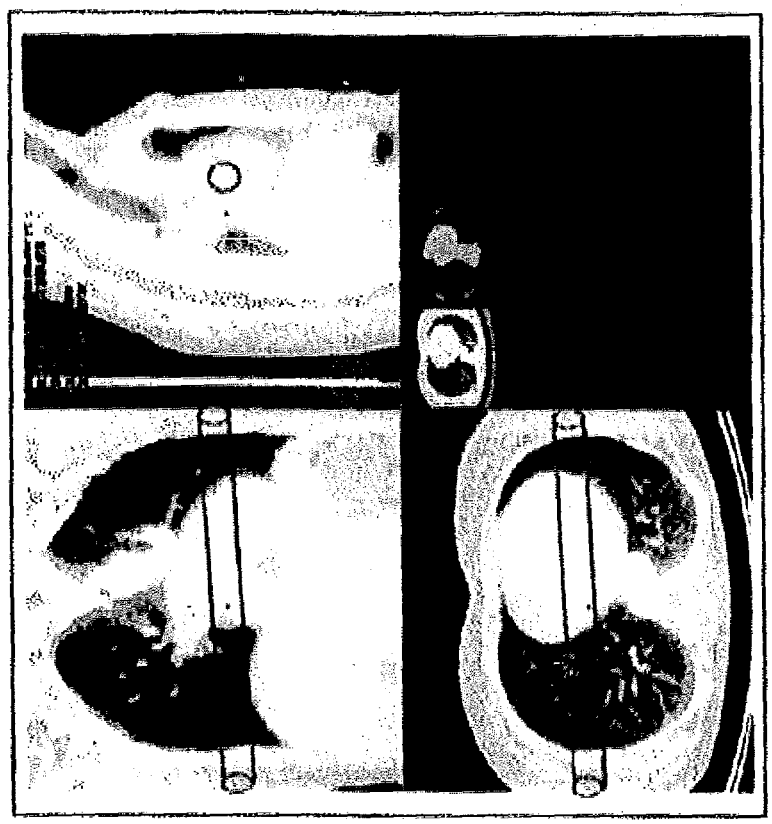
FIG. 5 is a set of medical images of the chest includes a visualization of a correspondence region of interest according to an embodiment of the present disclosure.
Figure 5:
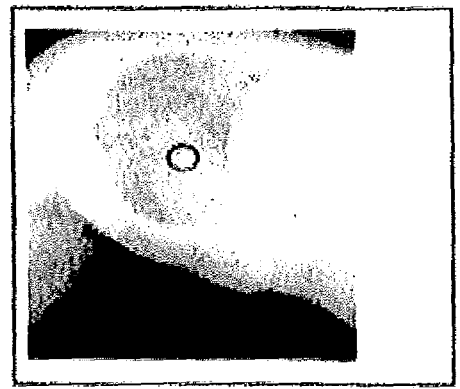

The basic overview of systems and methods according to the present disclosure is illustrated in FIG. 3. As indicated in FIG, 3, in order to review medical images and determine a region of interest, at step 21 systems and methods of the present disclosure must first acquire test images. These images may be as few as two, but are preferably many different types of images from different views and different modalities. Some basic exemplary images are shown in FIGS. 1, 4, and 5.

Following acquisition of the test images, at step 21 systems and methods in accordance with the present disclosure will automatically scan the images and automatically detect some or all of the landmarks and/or anatomic structures in each image.

For each images, at step 22 systems and methods in accordance with the present disclosure will correct the image for in-plane rotation, sizing, orientation, and alignment based at least in part upon the detected landmarks and anatomic structures. Systems and methods in accordance with the present disclosure must then calculate the correspondence between the images at step 23. For example, presuming two images have been acquired, scanned, and landmarks automatically detected, a system according to the present disclosure will correct the images for rotation and image alignment and will then determine the common subspace shared by the images.

For purposes of explanation but not limitation, the present disclosure refers to the DICOM patient coordinate system, in which the x-axis is from right to left, the y-axis is from front to back, and the z-axis is from feet to head of the patient imaged.

Given a pair of images, each can be two dimensional (2D), three dimensional (3D) or four dimensional (4D). The common subspace, referred to above, is the subspace shared by the two images. In other words, it is the shared axes between the two images. For example, a chest X-ray AP/PA image spans the x- and z-axes, and a chest X-ray LAT image spans the y- and z-axes. The common subspace in such an image pair is therefore the z-axis. Similarly, the common subspace between an AP/PA image and a CT volume is the xz-plane.

Returning to FIG. 3, a system according to the present disclosure will determine the common subspace shared by an acquired and scanned pair of images and will calculate the correspondence matrix in the common subspace. The correspondence matrix is a mathematical model for the correspondence between images. Based upon the correspondence matrix, if a location of interest is identified in a first or primary image, the system can determine the corresponding region of interest in the other image or images.

As indicated in FIG. 3, at step 23, the correspondence matrix can be calculated in one of three ways. The first method is to project the location of the detected landmarks and/or anatomic structures into the common subspace of the images, and directly match a subset of landmarks that are the same anatomical points. This is the most straightforward method of calculating a correspondence matrix, but in practice can be difficult to implement because often the identified landmarks in the common subspace are insufficient for a direct point-to-point correspondence. This is particularly true when reviewing projective images such as X-ray images in which anatomy appears very different in shape and location from different angles due to obstructed views and other issues.

A second method for calculating the correspondence matrix is to match detected landmarks and anatomic structures between images according to a predetermined spatial relationship, Such a predetermined spatial relationship can be a constantly updating model learned from examples using regression techniques.

Figure 2A:
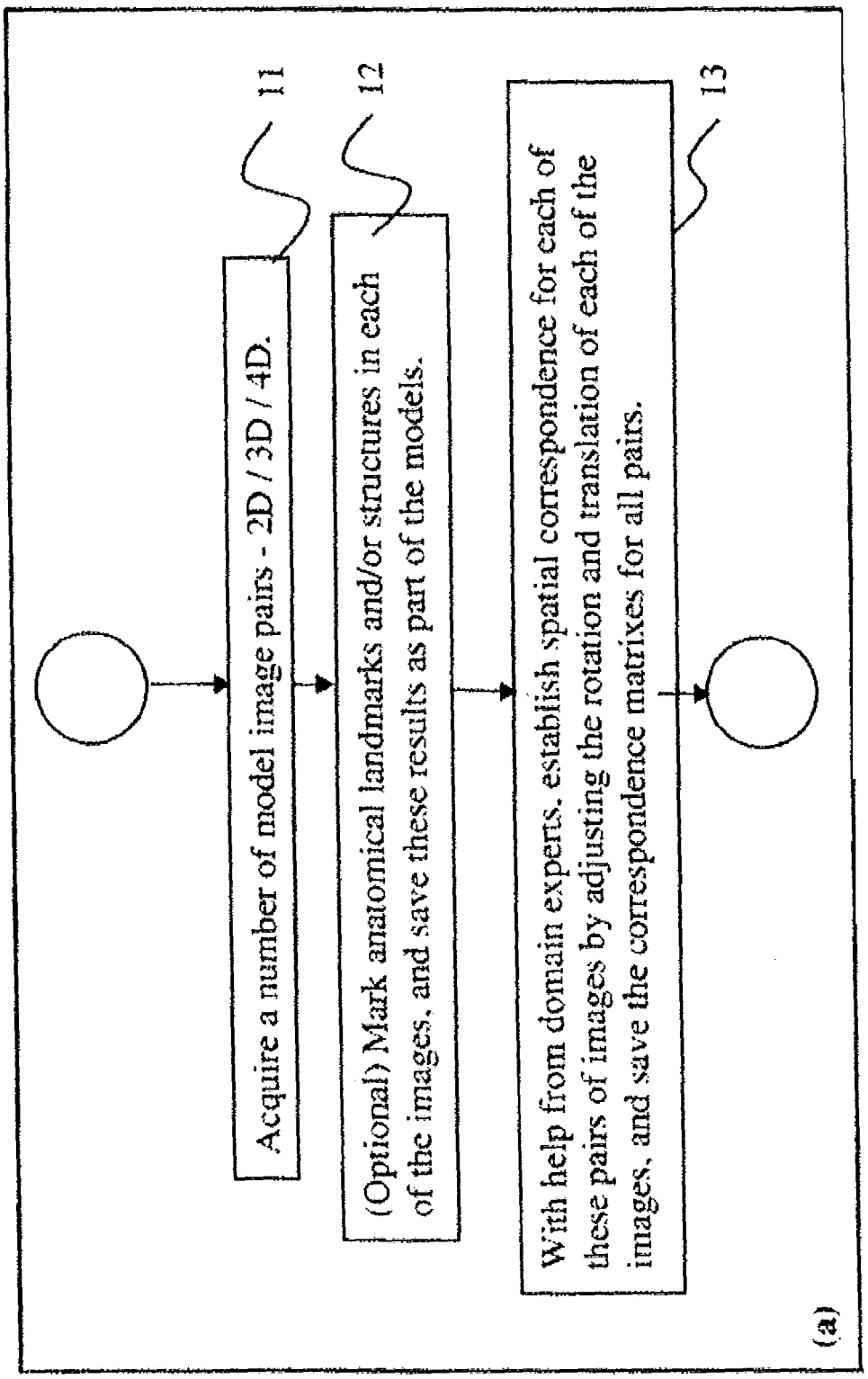
FIG. 2a is a flow chart illustrating a method for a training module for image analysis according to an exemplary embodiment of the present disclosure.

A third method for calculating the correspondence matrix is to match landmarks and anatomic structures to a training image set or sets and "borrow" the correspondence matrix(es) saved for the matched training set or sets, Regarding the predetermined spatial relationships, as shown in FIG. 2a, a training module can create a learned correspondence matrix defining average spatial relationships between various landmarks and anatomic structures. In order to create such a predetermined spatial relationship, at step 11, the system acquires a number of model image sets (in this example, image pairs). These image sets can be of 2D, 3D, 4D, or a mixture of image types. At step 12, if desired, the system can detect and mark anatomical landmarks and/or structures in each of the images and save those results as part of training models. At step 13, with the help of domain experts, the system can establish a spatial correspondence for each of the pairs of images by adjusting the rotation and translation of each of the images. Once determined, the system saves the calculated correspondence matrices for all pairs.

Figure 2B:
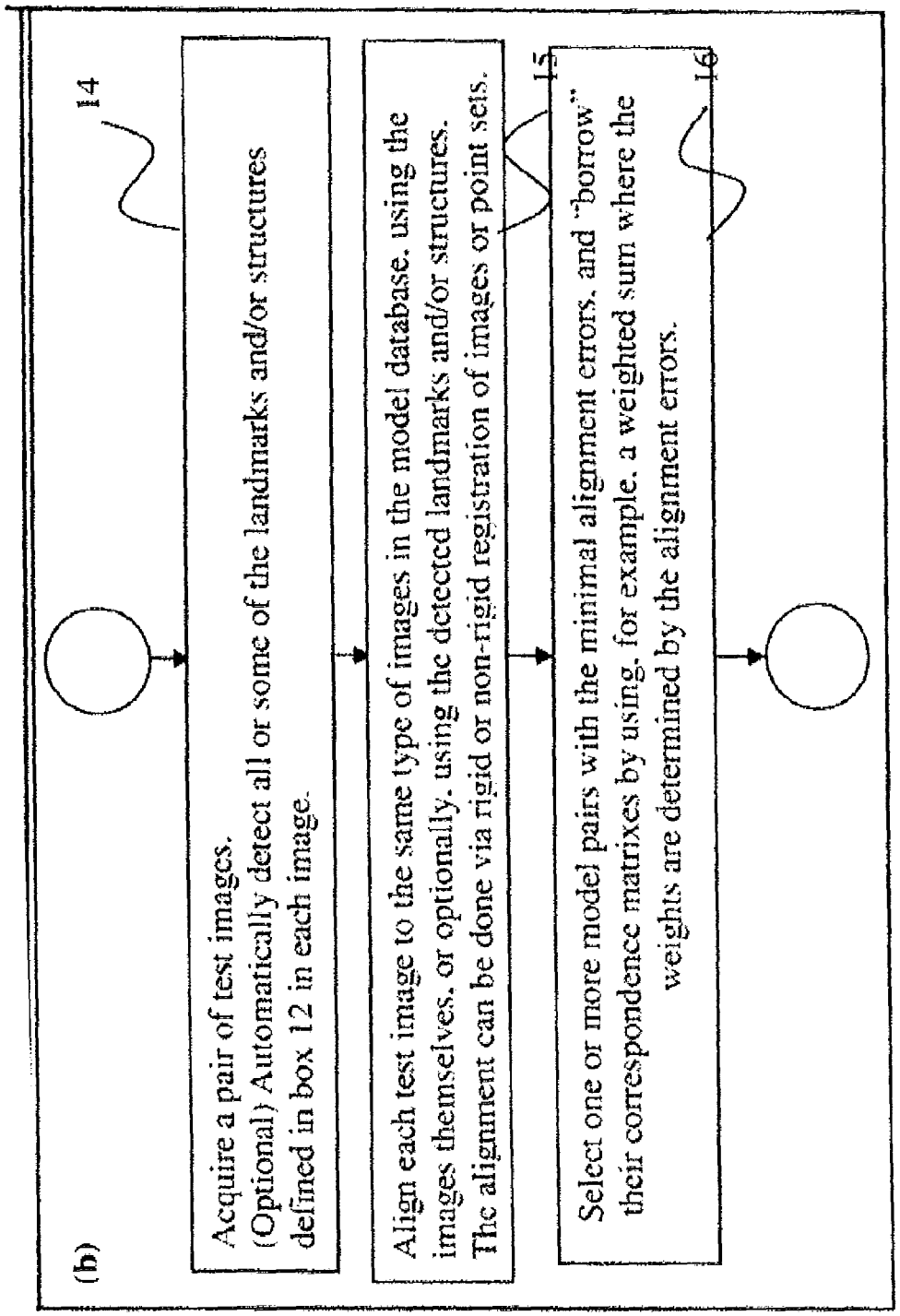
FIG. 2b is a flow chart illustrating a method for image analysis according to an embodiment of the present disclosure.

Regarding the third method of calculating a correspondence matrix described above, as shown in FIG. 2*b*, a system according to the present disclosure can identify exemplary model image pairs and use the saved correspondence matrix for such a pair in the analysis of a set of medical images. At step 14, the system acquires a pair of medical test images. The system can automatically detect some or all of the landmarks and/or anatomic structures in each image. At step 15, the system aligns each test image to match up with the same type of images in a model database using the images themselves, or optionally, using the detected landmarks and/or structures. The alignment of the images can be done via a rigid or non-rigid registration of images or point sets. A rigid registration can include simple image transformations such as rotation, scaling, and translation. A non-rigid registration enables the system to make more significant alterations to the image in order to align it with one or more images in the model database.

At step 16, the system according to the present disclosure identifies and selects one or more model pairs of images with minimal alignment errors that correspond to the acquired test images. The system then "borrows" or uses the correspondence matrix(es) saved for the one or more model pairs of images as the correspondence matrix of the acquired test images. If multiple model pairs are identified and used, the system can employ a weighted sum of the correspondence matrices of the various model pairs. The weights can be determined by the alignment errors for each of the model pairs.

Once a correspondence matrix has been calculated for a set of images, if a location of interest is identified in a first or primary image, either manually by a doctor or other user, or automatically by the system, the corresponding region of interest can be instantly identified and visualized in the other image or images.

For example, as shown in FIG. 4, a location of interest has been identified in the AP/PA chest X-ray (left). For purpose of illustration, the arrows in the images indicate the common subspace. For the pair of images, the region in the LAT image (right) corresponding to a point of interest in the AP/PA image forms a region or corridor in the LAT image. The corridor inherits the same coordinate in the common subspace of both images, but spans the whole range of the residual subspace of the LAT image as shown in FIG. 4. Due to uncertainties inherent in landmark detection and the corresponding calculation, the corridor is rendered as a region instead of a line in FIG. 4.

For a pair of images A and B, the residual subspace of B with respect to A is the subspace spanned by B but not by A. For example, the residual subspace of a chest X-ray LAT image with respect to an AP/PA image is the y-axis.

As illustrated in FIG. 4, as a user or doctor clicks or in any other way selects a location of interest in a first or primary image, in this case the AP/PA image on the left, a region or corridor of interest is shown in the other image or images, in this case the LAT image on the right.

As shown in FIG. 5, the corridor in a PET/CT image with respect to a click point in a lateral chest X-ray image spans the full range of the residual space which consists of the x-axis and the modality axis. Hence, a visualization of the corridor or region for such a PET/CT image is a "tunnel" or cylinder along the patient's x-axis (left to right) in both the PET and the CT image, located at the same location in the yz-plane as the original selected location of interest in the first or primary image. The matching should be established in the yz-plane.

The width or diameter of the corridor or region of interest can be determined by uncertainty encountered during the calculation of the corridor, including factors stemming from image quality, diseases, artifacts, articulations, and patient positioning variation, time lapse between two images, etc.

The cross-section of the corridor can be irregular, if uncertainties estimated in the common subspace are anisotropic in nature. This is possible when, for example, the voxel is highly anisotropic in the 3D image (e.g., MR images).

While the present disclosure has been generally described using x-, y-, and z-axes, the axes in the present system can go beyond those and can include the time axis, the modality axis, such as in the case of time-sequences (e.g., respiratory-gated imaging studies, or PET-CT, PET-MR studies). Such a respiratory-gated PET/CT study can be regarded as a 5D image.

System Implementations

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

Figure 6:
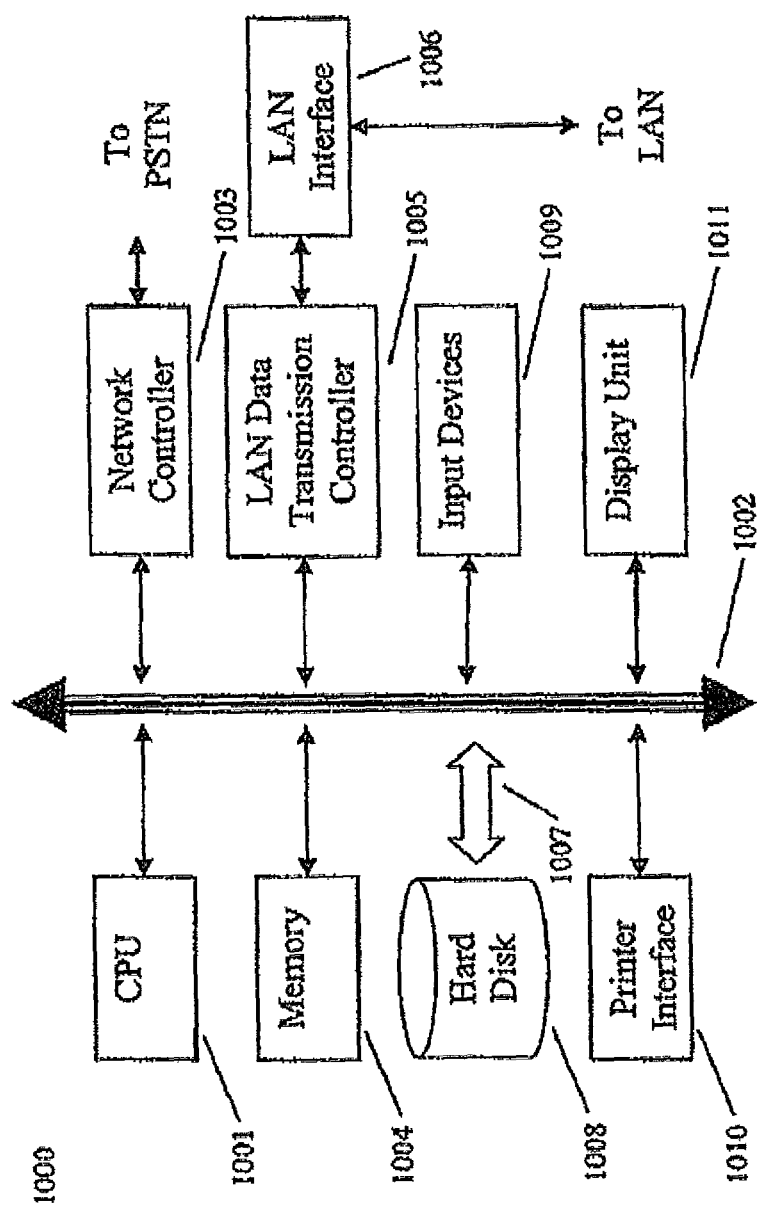
FIG. 6 shows an example of a computer system capable of implementing the method and apparatus according to embodiments of the present disclosure.

FIG. 6 shows an example of a computer system which may implement a method and system of the present disclosure. The computer system referred to generally as system 1000 may include, inter alia, a central processing unit (CPU) 1001, memory 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

The memory 1004 can include random access memory (RAM), read only memory (ROM), disk drive, tape drive, etc., or a combinations thereof. The present invention can be implemented as a routine that is stored in memory 1004 and executed by the CPU 1001. As such, the computer system 1000 is a general purpose computer system that becomes a specific purpose computer system when executing the routine of the present invention.

The computer system 1000 also includes an operating system and micro instruction code. The various processes and functions described herein can either be part of the micro instruction code or part of the application program or routine (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to exemplary embodiments, those skilled in the art will appreciate that various modifications and substitutions can be made thereto without departing from the spirit and scope of the invention as set forth in the appended claims. For example, elements and/or features of different exemplary embodiments may be combined with each other and/or substituted for each other within the scope of this disclosure and appended claims.

What is claimed is:

1. A method for detecting a corresponding region of interest in digital medical images by a computer system, comprising:
    receiving, by the computer system, a plurality of digital images including a primary image, wherein at least one of the plurality of images is a projective image and at least two of the plurality of images have different numbers of dimensions;
    identifying, by the computer system, anatomical landmarks and structures within each of the plurality of digital images;
    correlating, by the computer system, the plurality of images based on the identified anatomical landmarks and structures, by
        identifying a common subspace shared by at least one of the plurality of digital images with the primary image, wherein the common subspace includes a shared axis or plane,
        projecting the identified anatomical landmarks and structures into the common subspace, and
        calculating a correspondence matrix in the common subspace;
    identifying, by the computer system, a location of interest in the primary image; and
    automatically identifying, by the computer system using the correspondence matrix, a region of interest in the plurality of images, the region of interest corresponding to the identified location of interest in the primary image.

2. The method of claim 1, wherein the plurality of digital images includes one or more images selected from: X-ray images, CT scan images, PET scan images, PET-CT images, SPECT images, SPECT-CT images, MR images, MR-PET images, and dynamic scans of one of these modalities continuous in time or gated in time, where gating is based on respiration or cardiac cycles.

3. The method of claim 1, further comprising displaying, in response to a user selecting the location of interest in the primary image, a visualization on each of the plurality of images, the visualization highlighting the region of interest.

4. The method of claim 3, wherein the visualization is in the shape of a circle, sphere, band, or cylinder spanning one or more image modalities and one or more time points or a continuum of time.

5. The method of claim 1, wherein the plurality of digital images are all X-ray images.

6. The method of claim 1, the plurality of digital images comprising images from a plurality of different modalities.

7. The method of claim 1, correlating the plurality of images comprising, for each of the plurality of digital images correcting for in-plane rotations based on the identified anatomical landmarks and structures.

8. The method of claim 1, calculating the correspondence matrix comprising matching a subset of identified anatomical landmarks and structures in the primary image and at least one other of the plurality of digital images.

9. The method of claim 1, calculating the correspondence matrix comprising matching locations of the identified anatomical landmarks and structures in the plurality of digital images based upon a predetermined spatial relationship scheme.

10. The method of claim 1, calculating the correspondence matrix comprising:
    identifying at least one set of training images having substantially similar identified anatomical landmarks and structures; and
    selecting a training correspondence matrix of the at least one set of training images as the correspondence matrix of the plurality of digital images.

11. A non-transitory program storage device readable by a computer, tangibly embodying a program of instructions executable by the computer to perform method steps for detecting a corresponding region of interest in digital medical images, the method comprising the steps of:
    receiving a plurality of digital images including a primary image, wherein at least one of the plurality of images is a projective image, and least two of the plurality, of images have different numbers of dimensions;
    identifying anatomical landmarks and structures within each of the plurality of digital images;
    correlating the plurality of images based on the identified anatomical landmarks and structures, by
        identifying a common subspace shared by at least one of the plurality of digital images with the primary image, wherein the common subspace includes a shared axis or plane,
        projecting the identified anatomical landmarks and structures into the common subspace, and
        calculating a correspondence matrix in the common subspace;
    identifying a location of interest in the primary image; and
    automatically identifying, using the correspondence matrix, a region of interest in the plurality of images, the region of interest corresponding to the identified location of interest in the primary image.

12. The non-transitory computer readable program storage device of claim 11, wherein the plurality of digital images includes one or more images selected from: X-ray images, CT scan images, PET scan images, PET-CT images, SPECT images, SPECT-CT images, MR images, MR-PET images, and dynamic scans of one of these modalities continuous in time or gated in time, where gating is based on respiration or cardiac cycles.

13. The non-transitory computer readable program storage device of claim 11, the method further comprising displaying, in response to a user selecting the location of interest in the primary image, a visualization on each of the plurality of images, the visualization highlighting the region of interest.

14. The non-transitory computer readable program storage device of claim 13, wherein the visualization is in the shape of a circle, sphere, band, or cylinder spanning one or more image modalities and one or more time points or a continuum of time.

15. The non-transitory computer readable program storage device of claim 11, wherein the plurality of digital images are all X-ray images.

16. The non-transitory computer readable program storage device of claim 11, the plurality of digital images comprising images from a plurality of modalities.

17. The non-transitory computer readable program storage device of claim 11, the method of correlating the plurality of images further comprising, for each of the plurality of digital images correcting for in-plane rotations based on the identified anatomical landmarks and structures.

18. The non-transitory computer readable program storage device of claim 11, the method of calculating the correspondence matrix comprising matching a subset of identified anatomical landmarks and structures in the primary image and at least one other of the plurality of digital images.

19. The non-transitory computer readable program storage device of claim 11, the method of calculating the correspondence matrix comprising matching locations of the identified anatomical landmarks and structures in the plurality of digital images based upon a predetermined spatial relationship scheme.

20. The non-transitory computer readable program storage device of claim 11, the method of calculating the correspondence matrix comprising:

identifying at least one set of training images having substantially similar identified anatomical landmarks and structures; and selecting a training correspondence matrix of the at least one set of training images as the correspondence matrix of the plurality of digital images.

\* \* \* \* \*